(12) United States Patent
Messana (10) Patent No.: US 6,883,590 B1
(45) Date of Patent: Apr. 26, 2005

(54) SELF-SUPPORTING, MODULAR PREFABRICATED RADIATING PANEL

(75) Inventor: Roberto Messana, Pordenone (IT)

(73) Assignee: Plan Holding GmbH, Villach (AT)

( * ) Notice: Subject to any disclaimer, the term of this patent is extended or adjusted under 35 U.S.C. 154(b) by 0 days.

(21) Appl. No.: 09/856,549

(22) PCT Filed: Nov. 22, 1999

(86) PCT No.: PCT/IB99/01864

§ 371 (c)(1),
(2), (4) Date: Sep. 7, 2001

(87) PCT Pub. No.: WO00/31472

PCT Pub. Date: Jun. 2, 2000

(30) Foreign Application Priority Data

Nov. 23, 1998 (EP) .................................. 98830703

(51) Int. Cl.⁷ ................................................ F24H 9/06
(52) U.S. Cl. ............................ 165/56; 165/49; 237/69
(58) Field of Search ........................... 165/56, 49, 171; 237/69

(56) References Cited

U.S. PATENT DOCUMENTS

| | | | | |
|---|---|---|---|---|
| 2,548,036 A | * | 4/1951 | Milborn .................... | 165/56 |
| 2,598,279 A | * | 5/1952 | McKibbin .................. | 165/56 |
| 3,135,040 A | * | 6/1964 | Watson | |
| 3,246,689 A | * | 4/1966 | Remde et al. | |
| 3,560,323 A | * | 2/1971 | Zwickert | |
| 3,616,590 A | * | 11/1971 | Shotmeyer | |
| 4,205,719 A | * | 6/1980 | Norell et al. ............ | 165/49 X |
| 4,212,348 A | * | 7/1980 | Kobayashi ................ | 165/49 |
| 4,635,710 A | * | 1/1987 | Shelley ..................... | 165/56 X |
| 4,723,598 A | * | 2/1988 | Yoshio et al. ............ | 165/56 X |
| 5,131,458 A | * | 7/1992 | Bourne et al. ........... | 165/49 X |
| 5,497,826 A | * | 3/1996 | Ingram ..................... | 165/56 |
| 5,577,554 A | * | 11/1996 | Umina ..................... | 165/56 X |
| 5,729,936 A | * | 3/1998 | Maxwell | |
| 5,799,454 A | * | 9/1998 | Andersson et al. ..... | 165/56 X |
| 5,931,381 A | * | 8/1999 | Fiedrich ................... | 237/69 |

FOREIGN PATENT DOCUMENTS

| | | |
|---|---|---|
| DE | 90 12 650.5 | 11/1990 |
| DE | 41 37 753 A1 | 5/1993 |
| EP | 0 501 470 A1 | 9/1992 |
| JP | 10-96522 * | 4/1998 |
| JP | 10-132312 * | 5/1998 |
| JP | 2000-146203 * | 5/2000 |

* cited by examiner

Primary Examiner—Ljiljana Ciric
(74) Attorney, Agent, or Firm—Young & Thompson (57) ABSTRACT

A prefabricated, self-supporting, modular radiating panel with a sandwich structure comprises a layer of plasterboard and a layer of heat-insulating material. The plasterboard layer incorporates, internally, several continuous pipes which are designed to form independent hydraulic circuits and the end portions of which emerge all along a same edge of the panel. The independent hydraulic circuits are each housed in adjacent modular zones of the panel, the zones being separable from one another so as to provide panel parts of different sizes in a modular manner.

17 Claims, 7 Drawing Sheets

SELF-SUPPORTING, MODULAR PREFABRICATED RADIATING PANEL

The present invention relates to a prefabricated, self-supporting, modular radiating panel, and in particular to a panel of this type used for forming radiating surfaces, such as, for example, walls and ceilings, in conditioning systems for rooms. The invention also relates to methods for manufacturing said radiating panel and to a radiating surface formed with a plurality of these panels.

For many years plasterboard panels have been known and regarded as extremely versatile elements for forming false ceilings and dividing walls in both newly constructed and already existing buildings. These panels combine properties of good structural solidity, lightness and an optimum finish of the external surface and therefore may be successfully used for fast and clean operations since all traditional masonry work involving the use of mortar, bricks, plaster and the like may be eliminated entirely. These panels are therefore used with particular advantage for work involving th maintenance or modernisation of existing buildings since installation thereof requires very brief interruption in the use of the buildings themselves and does not cause deterioration of the furnishings which have already been installed therein.

In recent years plasterboard panels have found a new and very interesting use in the manufacture of radiating panels designed to form radiating surface conditioning systems for rooms, in particular in existing building structures, said systems, as is well-known, being characterized by a degree of ambient comfort which is much greater than that of traditional air-conditioning systems and therefore generating a growing interest in the market.

The manufacture of said radiating panels involve the association, on one side of the plasterboard panels, of a coiled piping for circulation of the thermal carrier fluid. The association of the coiled piping with the plasterboard panel is currently performed using two different techniques. A first technique involves milling, at the factory, of the rear side of the panels, insertion of the coiled piping into the milled areas and finally plastering over in order to fix the piping in position and improve the heat exchange between piping and panel. A second technique, which can be used instead on-site, involves fixing with adhesives, to the front side of the panel, a piping already pre-formed with a predefined configuration and plastering the panel with cement mortar or gypsum plaster.

The radiating panel structures described above already represent a considerable step forwards compared to the known prior art which envisaged, by way of alternative, the formation of radiating panels using traditional masonry techniques (EP-A-340,825; EP-A-511,645; EP-A-770,827) which therefore cannot have a practical application in forming room conditioning system in existing buildings, or the use of metal panels (EP-A-366,615; EP-A-452,558; WO 88/06259) which are costly and heavy and moreover are not suitable, from both an aesthetic and a functional point of view, for the formation of radiating surfaces in rooms for residential use.

Moreover, the structures consisting of plasterboard radiating panels as described above have been subject to various major inconveniences which hitherto have constituted a significant obstacle to their widespread use. It should be noted in fact that the radiating panels produced with the first of the techniques described above are seriously weakened by the milling operations involving incision of an external layer thereof and this, during transportation and installation, result in a high percentage of damage (20–30%) due to breakage; moreover, these panels, precisely because they are formed outside of the building site, are quite unflexible from a construction point of view since each panel either is supplied in a standard side and therefore gives rise to major problems in terms of applicational adaptability or is made-to-measure for each particular job and therefore, during application, must match exactly the design requirements, thus depriving the installation engineer of any working flexibility and moreover creating considerable difficulties with regard to site management. In this latter case, in fact, supplying of the individual panels cannot be performed in a random manner, but must be carefully planned and executed, strictly in keeping with the progress of the panel installation work itself. The radiating panels made using the second above-mentioned technique obviously do not have these drawbacks, but instead have the major disadvantage that they require plastering with cement mortar or with gypsum plaster on-site, thus eliminating one of the essential advantages of this type of product, namely that of allowing "clean" installation in an existing building structure where the furnishings are already in place. DE-A-4137753 discloses a radiating panel in which a plurality of parallel capillary pipes are embedded in a plasterboard and connected at their opposed end to respective headers included in the panel structure. DE-U-9012650 discloses fixing systems for radiating panels.

The object of the present invention is therefore that of providing a plasterboard-based radiating panel which avoids the problems and the drawbacks mentioned above and which in particular has a high structural strength and rigidity and allows installation with a finished surface without the use of mortar or plaster so as to be suitable also for installation in existing buildings.

Another object of the present invention is that of providing a plasterboard radiating panel of the abovementioned type which does not have the drawbacks of applicational unflexibility associated with the known panels but which allows, using a single standard factory size, very flexible modular application in the individual installations, thus avoiding both the need to produce panels which are made-to-measure for the particular job in question and the drawback of complicated logistical management with regard to supplying of the panels on-site.

A further object of the present invention is that of providing a radiating panel which is very easy to assemble, from both a mechanical and hydraulic point of view, so as to allow correct and fast application also by workers who are not particularly specialised.

These objects are achieved according to the present invention by means of a prefabricated, self-supporting, radiating panel with a sandwich structure, characterized in that said sandwich structure comprises a layer of plasterboard and a layer of heat-insulating material and in that the plasterboard layer is provided, internally, with at least one continuous pipe which is designed to form a hydraulic circuit and the end portions of which emerge from the panel.

According to an important feature of the panel, said plasterboard layer comprises a plurality of said continuous pipes each housed in adjacent modular zones of the panel, said zones being separable from one another so as to provide panel parts of different sizes in a modular manner.

Further features and advantages of the present invention will emerge, however, more clearly from the detailed description which follows of preferred embodiments thereof, illustrated in the accompanying drawings, in which.

With reference to FIGS. 1–5, each radiating panel P according to the present invention comprises an external layer of plasterboard 1 and an internal layer of heat insulating material 2. The plasterboard layer 1 may have, in an economically advantageous manner, a traditional sandwich structure consisting of two external sheets of cardboard and an internal gypsum core, or other structures known per se, for example one in which the reinforcing fibre is for example distributed in a uniform manner inside the gypsum matrix; the insulating layer 2 preferably consists of an expanded or extruded heat insulating material such as, for example, polystyrene, polyurethane, glass wool and the like.

Figure 2:
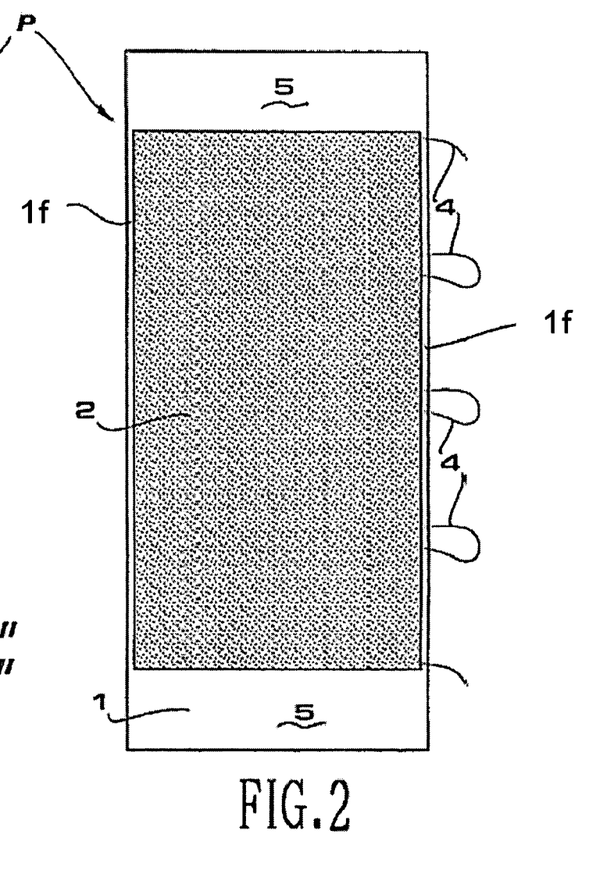
FIG. 2 is a rear elevation view of the panel according to FIG. 1.
Figure 5:
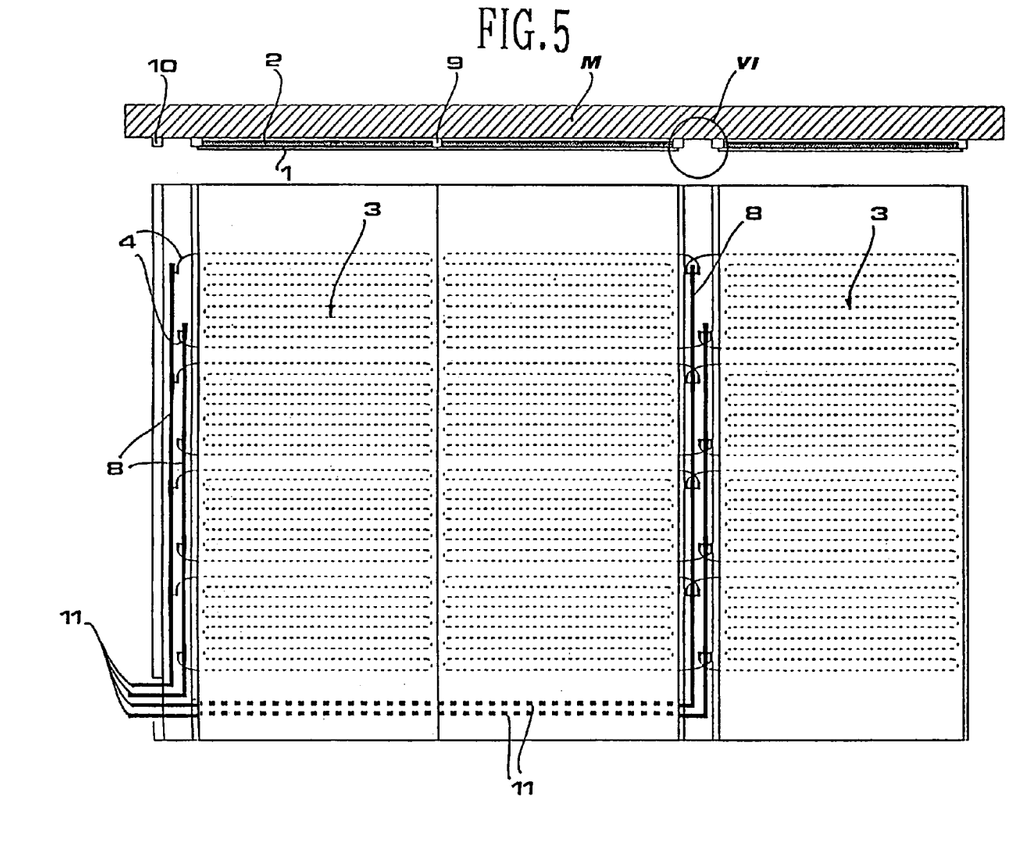
FIG. 5 is a front elevation and plan view illustrating the mechanical fixing and hydraulic assembly of a plurality of radiating panels according to the present invention which are arranged adjacent to one another so as to form a radiating surface.
Figure 6A:
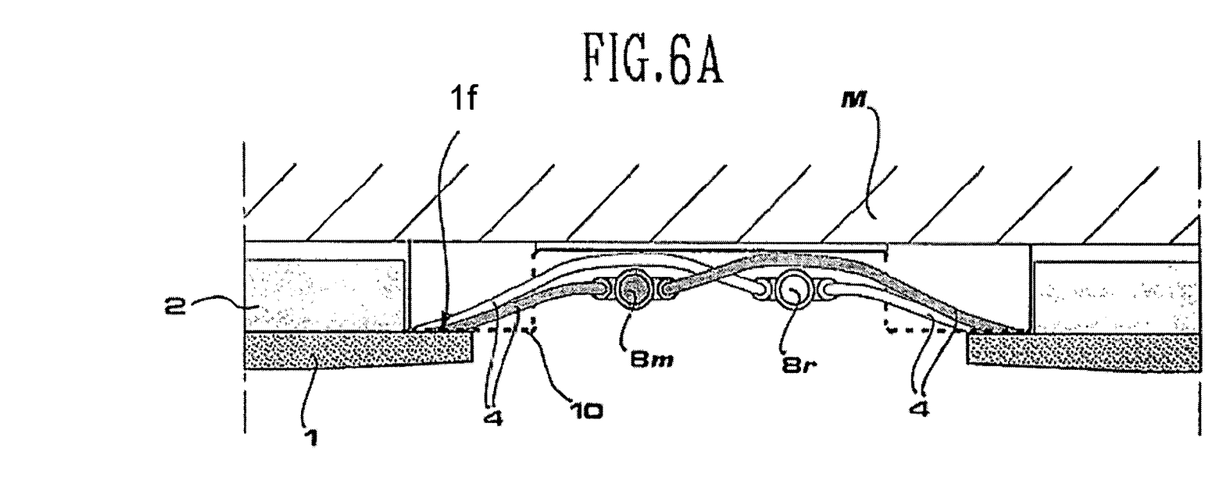
FIG. 6A is a enlarged detail of the encircled zone VI in FIG. 5.

The plasterboard layer 1 has, embedded internally, a plurality of continuous pipes 3 which each form an independent hydraulic circuit, the end portions 4 of which emerge laterally in the back from the panel P. The pipes 3 preferably have a circular cross-section and are arranged along a coiled path as illustrated in the drawings, it also being possible to use any other arrangement or shape of said pipes according to the invention. More precisely, as can be seen in FIGS. 2, 5 and 6A, the dimensions of the plasterboard layer 1 are slightly greater than those of the insulating layer 2, both laterally, in order to leave side strips 1f of the plasterboard layer 1 exposed for mechanical fixing of said layer and for emergence of the end portions 4 of the pipes 3, and at the top and the bottom, where zones 5 of the layer 1 ar left exposed especially so as to allow housing of the main pipes for the supply and return flow of the thermal carrier fluid, as will be described in greater detail below. The abovementioned arrangement of the end portions 4 and the zones 5 facilitates considerably, as we shall see, standardisation of the production and the hydraulic connection of the individual circuits, also allowing the formation of a continuous external surface of plasterboard with an optimum finish.

Figure 1:
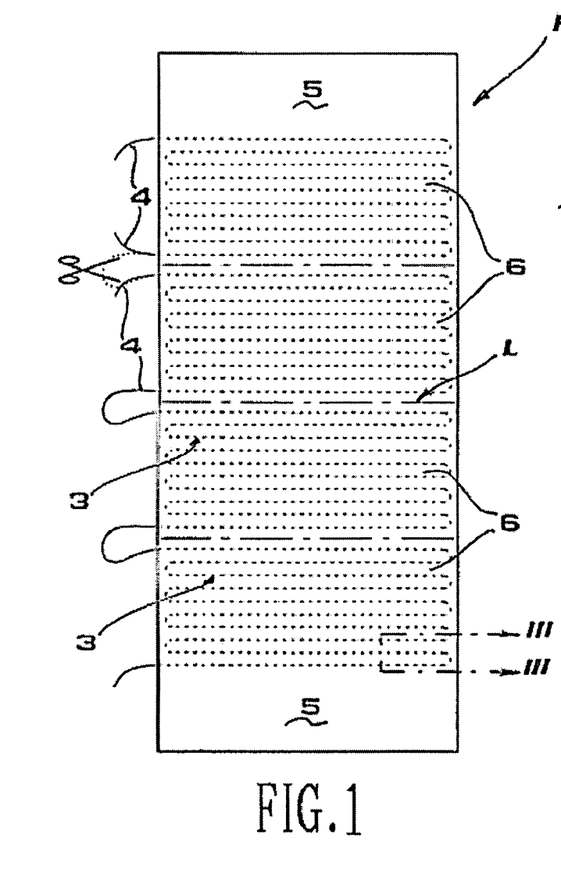
FIG. 1 is a front elevation view of a radiating panel according to the present invention.

Each coiled pipe 3 extends exclusively inside only one of several adjacent zones 6 which form the panel P, without there being, therefore, any overlapping with the adjacent pipes. The perimeter of the zones 6, indicated by parallel broken linear marking lines L in FIG. 1, is preferably also physically highlighted on the surface of the panel P using any method usefl for this purpose, such as scoring or colouring obtained by means of silk-screen printing, adhesive strips and the like. The top and bottom end zones 5 of the panel P are completely free from both the coiled pipes 3 inside the plasterboard layer 1 and, as has already been seen, the heat insulating layer 2.

The insertion of the coiled pipes 3 inside the plasterboard layer 1 may be performed using two different manufacturing methods. The first method may be applied with success both to large-size and medium or small-size production since it requires only a minimum amount of plant equipment and uses materials which are normally available on the market. The starting material in fact consists of standard panels of insulating material and standard plasterboard panels. Several coil-shaped cavities 7 are milled in one side of the plasterboard panel and a corresponding pipe 3 is then arranged in each of them so as to form an independent hydraulic circuit. Alternately and in a preferred manner, the pipes inserted into the cavities 7 are in the form of a single pipe which emerges from the panel at the end of each cavity 7 and enters back into it at the start of the next cavity (FIGS. 1 and 2); in this way it is sufficient to close off the two ends of the overall pipes 3 in order to avoid the undesirable introduction of foreign or contaminated material into the piping during transportation and installation of the panel. At the time when hydraulic connection is performed, the pipe 3 is cut at points corresponding to the end of each hydraulic circuit, as shown in FIG. 1, and is then connected to supply headers, as will be explained more clearly below.

Figure 3:
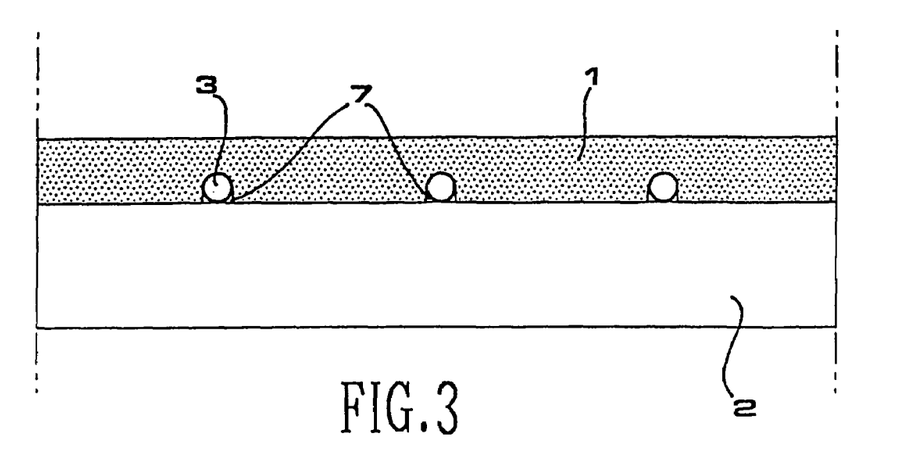
FIG. 3 is a partial sectioned view, on a larger scale, along the line III—III of FIG. 1, of a first embodiment of the panel.
Figure 4:
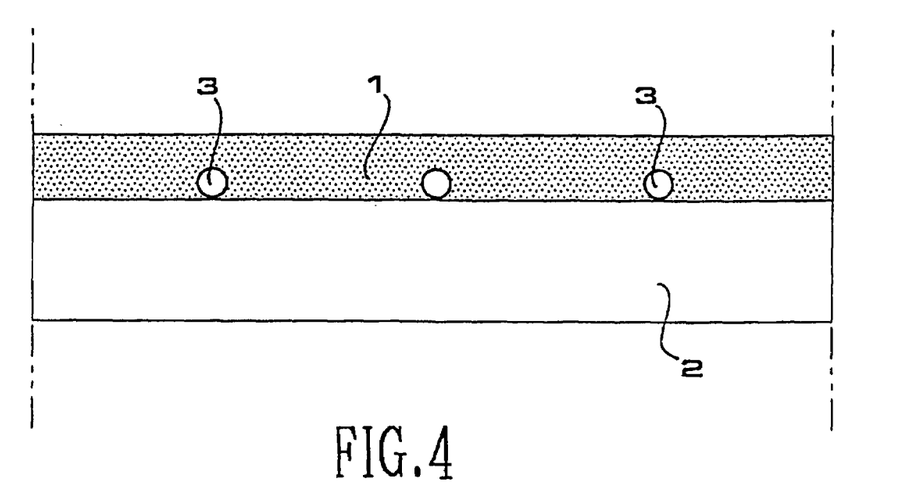
FIG. 4 is a view, similar to that of FIG. 3, of a second embodiment of the panel.

This manufacturing method is illustrated in FIG. 3, where cavities 7 with U-shaped cross-sections are shown; other cross-sectional shapes are obviously possible so as to match more closely the cross-sectional shape of the pipes 3. Once the pipes 3 have been inserted, the cavities 7 are filled and plastered with gypsum plaster or with a suitable heat-conducting cement and then the plasterboard layer 1 is ready for joining to the heat insulating layer 2 which is cut to the desired size from the standard insulating panels which are available on the market. This joining operation is performed by means of gluing using methods which are well-known in the art and produces finally the panel P which is ready for installation.

A second manufacturing method, on the other hand, may be applied only to large-scale production, being directly integrated within the process for the manufacture of plasterboard panels. In this second method, in fact, the coiled pipes 3 are inserted into the plasterboard layer 1 during the formation of the gypsum core, so as to be incorporated within it, as schematically illustrated in the cross-sectional view according to FIG. 4. Compared to the above first method, on account of greater industrialisation of this process it is possible to achieve with the same advantageous economies of scale.

A substantial advantage of the first manufacturing method, moreover, is that of its immediate applicability, since it does not require any modification of the current industrial methods of manufacturing plasterboard panels—said modification, on the contrary, being necessary in the second manufacturing method according to the present invention—nor the setting-up of complex production plants. On the other hand, the present invention brilliantly overcomes the single drawback associated with the use of commercially available plasterboard panels, namely the drawback already discussed above and consisting in the reduction of the mechanical strength of the plasterboard panel as a result of the fact that one of the two cardboard sheets undergoes milling and therefore loses part of its reinforcing function. This drawback is in fact completely overcome, according to the present invention, precisely as a result of joining together of the plasterboard layer 1 and the heat insulating layer 2, which joining operation, in addition to achieving the necessary thermal insulation of the pipes 3, produces a new reinforcing sandwich effect which amply offsets the loss of mechanical strength due to the milling of one of the cardboard sheets of the plasterboard layer 1, thus rendering the panel according to the present invention completely self-supporting. It is obviously preferable, in this first manufacturing method, to use a material which has good mechanical properties, such as polystyrene for example, as the material for the heat insulating layer 2.

The pipes 3 may be made equally well of plastic or metallic material. In the first manufacturing method, plastic pipes are preferably used since they can be inserted more easily and quickly inside the milled areas, in particular if the latter are performed using manual or semi-automatic site equipment and therefore do not reproduce exactly a pre-defined pattern. Metal pipes, and in particular stainless steel pipes, are instead preferred for use in the second method of manufacturing the panels and may also be used in the first method, but only where the milling is performed by fully automatic machines.

Metal pipes obviously have the advantage, compared to pipes made of plastic, that they facilitate considerably the subsequent execution of holes in the wall for furnishing requirements, both because they can be easily detected using a normal metal detector and because they have a sufficiently high mechanical strength to withstand the perforating action of a simple nail, provided that the latter is struck with a certain degree of care. However, stainless steel pipes have a much higher cost than plastic pipes which are therefore always preferred when cost is a decisive-factor in the application.

In order to be able to determine the location of said pipes inside the wall and therefore be able to perform the desired boring operations without the risk of damaging the pipes themselves, heat-sensitive liquid crystal sheets from some time have been available on the market, said sheets being placed on the wall and revealing, by means of a different colour, the presence of the pipes on the basis of their different temperature compared to that of the surrounding wall. This method, however, cannot be used as easily and quickly as a metal detector since it necessarily requires activation of the system and lapsing of a certain amount of time before the differences in temperature become evident on the surface of the wall. According to the present invention, it is proposed instead using plastic pipes which incorporate, inside their plastic wall, a thin continuous metal wire which is sufficient to allow detection of the piping with a metal detector. Since the metal wire is incorporated in the plastic and therefore is not subject to any stress, it may be made with a fineness such that it has a negligible cost and does not reduce in any way the flexibility of the plastic pipe.

Assembly of the panels P in order to form a radiating surface according to the present invention is performed in an extremely simple manner, both from the mechanical point of view, namely as regards fixing of the panels to the pre-existing masonry walls or ceilings, and from the point of view of the hydraulic connection of the individual pipes 3 to the main lines supplying the thermal carrier fluid.

Figure 7:
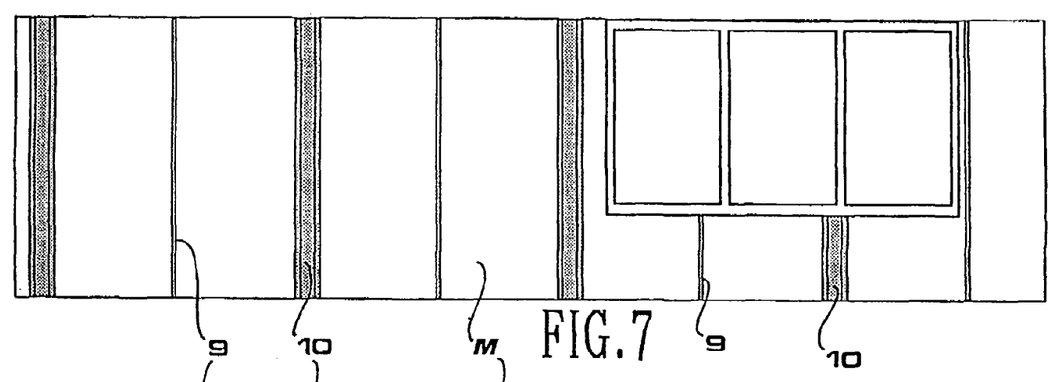
FIGS. 7 and 10 show a corresponding number of front elevation views of the different stages of assembly of a radiating wall according to the present invention, on a pre-existing masonry structure with windows.
Figure 8:
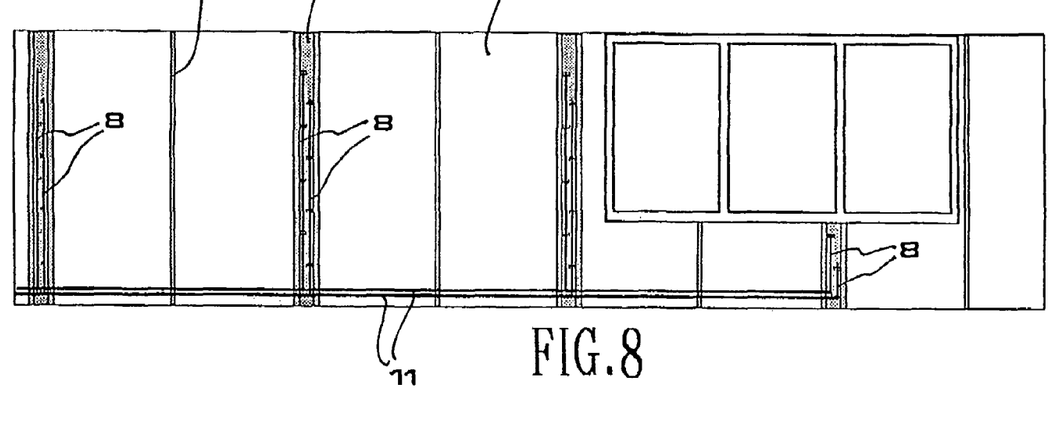

In this radiating surface, the panels P according to the present invention are in fact arranged in pairs—respectively in the position illustrated in FIG. 1 and a position rotated planewise through 180°—along the wall or the ceiling to be lined, in the manner illustrated in FIG. 5, namely so that they are adjacent along the sides without the end portions 4, and are separated by a predetermined distance, sufficient to allow insertion of secondary headers 8, along the sides provided with end portions 4. For faster and easier assembly, the arrangement of the zones 5 and 6 inside the panel P is preferably symmetrical with respect to a middle axis of the panel, parallel to the lines L, such that in the region of the headers 8 the end portions 4 of two adjacent panels are all levelled. In practice; in preparing a radiating surface according to the present invention, assembly is performed four successive steps, shown in FIGS. 7 to 10. First of all, see FIG. 7, at the joints between adjacent panels, metal support sections 9 with a square or U-shaped cross-section are fixed to the masonry structure M, while metal support sections 10 with an Ω-shaped cross-section are fixed to the wall at the joints between panels located at a distance from one another, said sections therefore being arranged alternately with respect to the sections 9 and their width determining the distance between pairs of non-adjacent panels. Once the sections 9 and 10 have been fixed onto the masonry structure M to be lined—with an interval between sections 9 and flanges of the sections 10 which is identical to the width of the panels P—the installation engineer then installs the main lines 11 supplying the thermal carrier fluid, which are housed in the top or bottom end zones 5 of the panels, as well as the secondary headers 8 which, as already mentioned, are housed inside the Ω-shaped sections 10. This assembly step is illustrated in FIG. 8.

Figure 6B:
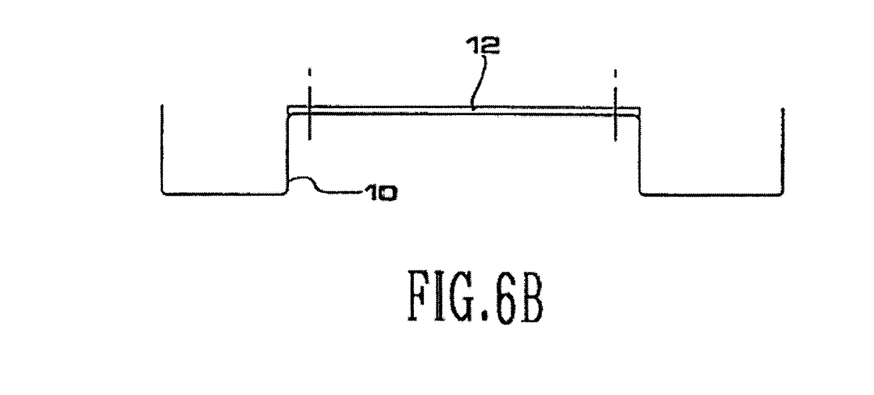
FIG. 6B is a plan view of solely the Ω-shaped metal support section according to FIG. 6A.

The lines 11 and the headers 8 may be made using one of the many techniques available today. For faster and easier assembly, plastic pipes and fast snap-action unions are obviously preferred since they avoid having to perform heat-welding operations which are awkward and difficult to perform, in particular in the case of ceiling applications. A sheet of heat-insulating material 12 is preferably arranged between the end wall of the Ω-shaped section 10 and the supporting masonry structure M (see FIG. 6B), so as to prevent any dispersion of heat towards said masonry structure by the headers 8. Alternatively, these pipes may be of the type which are independently insulated as is the case, preferably, for the lines 11. Finally, where necessary and in an entirely traditional manner, heat insulating panels may be inserted in the zones 5 which are not used for housing the lines 11.

Figure 9:
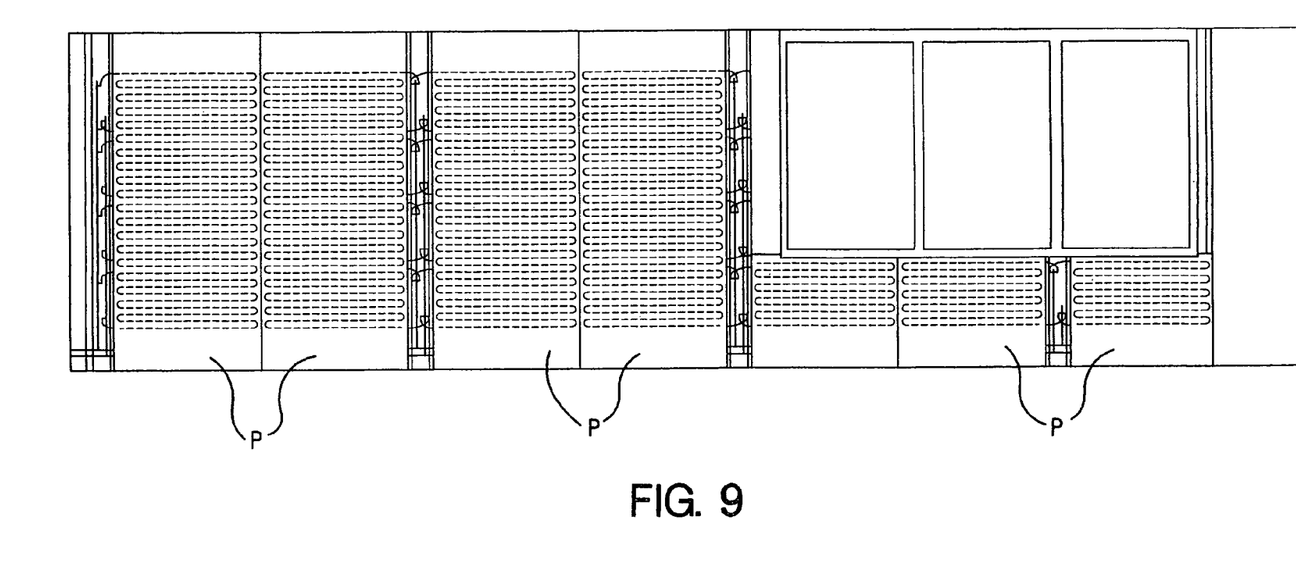

After arranging the pipes 8 and 11 in position, the installation engineer is able to perform fixing and hydraulic connection of the panels P (FIGS. 9 and 6A). Said panels are fixed mechanically on one side to the sections 9 and on the other side to the flanges of the sections 10, in an entirely traditional manner, while the end portions 4 of the coiled pipes 3 are connected to the supply and return headers 8*m* and 8*r* by means of the abovementioned fast-action unions. As illustrated in FIG. 6A, the end portions 4 pass through the flanges of the Ω-shaped section 10 via special openings provided opposite each pair of end portions 4 and, after being cut to size, are connected to the corresponding supply headers 8*m* and return headers 8*r*.

Figure 10:
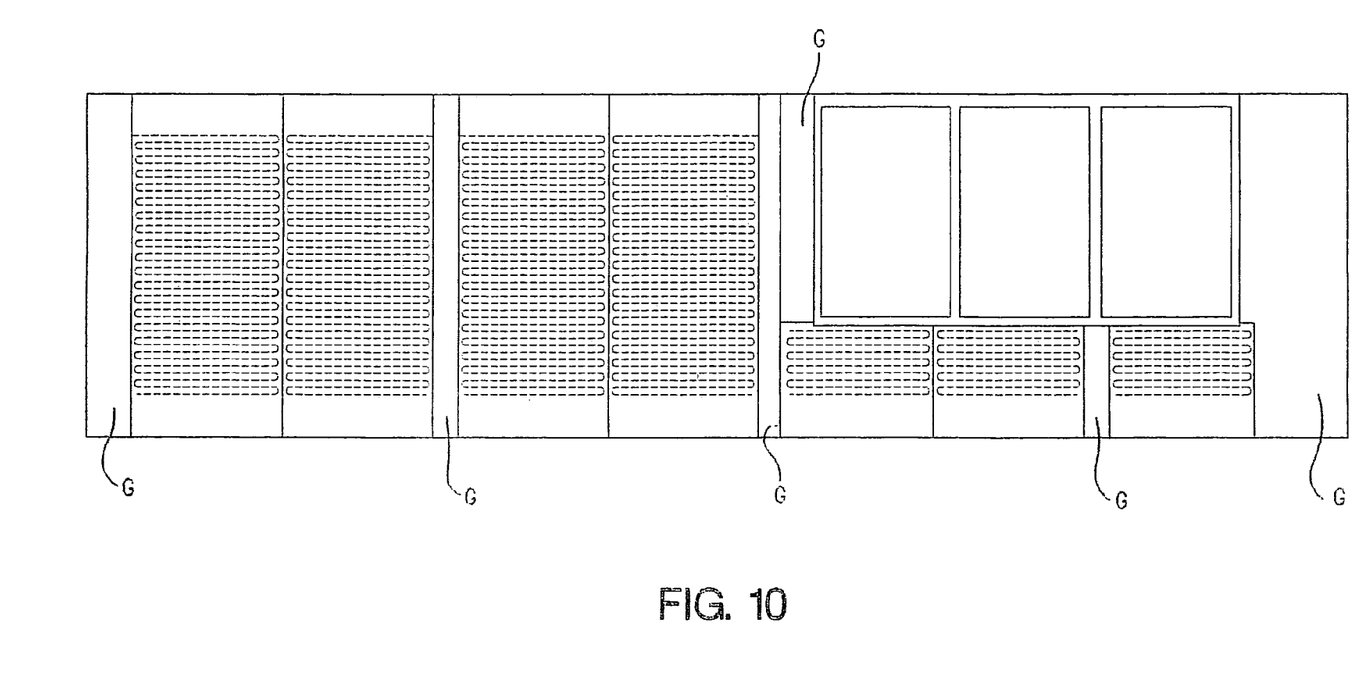

Finally, as illustrated in FIG. 10, covering panels C consisting of plasterboard alone are fixed onto the said sections 9 and 10 so as to obtain a continuous finished surface of the radiating wall, which is ready for application of the final coat of paint.

According to an important characteristic feature of the present invention, the panel P is produced in a single standard size and adaptation to the individual installation requirements is achieved with extreme simplicity, by simply "splitting" the panel along the linear marking lines L between adjacent zones 6. In the embodiment shown the panel P has dimensions of 120×270 cm and the individual zones 6 have a height of 45 cm and are separated by a distance of 8 cm free from pipes; other measurements are obviously possible, depending on the standard sizes of the panels available on the market and the number of zones 6 formed in the individual panel. In this way, owing to the complete separation and independence of the individual circuits formed by the coiled pipes 3, it is possible to obtain rapidly and easily panels P both of limited height, by eliminating one or more zones 6 from a standard panel, as occurs for example in the zones underneath windows shown in FIGS. 9 and 10, as well as panels of greater height, as may occur in stairwells and the like, by adding one or more zones 6, taken from one panel, to another panel P.

This type of operation obviously does not result in any reject material since any individual surplus panel zones 6 can always be mounted on top of one another so as to form a whole panel P, without having to vary in any way the fixing system which is based on the sections 9 and 10 and on the headers 8 described above. A simple plastering operation performed over the joints between panels P or individual zones 6 of panels adjacent to one another will allow one to eliminate all external signs of the composit arrangement used to achieve the formation of the final wall. It goes without saying that the peripheral zones for joining to the surrounding walls of the radiating-panel wall thus formed may consist of ordinary plasterboard panels G which are suitably shaped, in the case where, owing to the dimensions of the wall to be lined or the irregular nature of its perimeter, this is advisable or also simply more convenient, or when the planned size of the radiating surface has been reached.

The modular arrangement of the pipes 3, and hence their formation into independent hydraulic circuits, also results in another considerable advantage during operation of the radiating surface. In fact, the circuit geometry used allows a significant reduction in the overall head losses in the individual hydraulic circuit and consequently a low "ΔT" value between the supply and return of the thermal carrier fluid. This ensures a high degree of uniformity of surface heat which is an essential requirement for obtaining a high radiating exchange with the environment, in particular in the case of cool summer conditions where the working temperature of the panel must never be lower than the dew-point temperature of the ambient air.

From the above description it should therefore be extremely clear how the prefabricated radiating panel according to the present invention has fully achieved the preset objects of the invention.

On the one hand, in fact, owing to the sandwich combination of the plasterboard layer with the insulating layer, the panel according to the present invention has an excellent mechanical strength during storage, transportation and installation operations, so as to reduce considerably the risk of damage to the material during these operations. On the other hand, owing to the modular structure of the individual conditioning circuits formed by the coiled pipes, both a high degree of flexibility during installation and a complete standardisation of production is achieved. The modular nature of the panels, finally, also allows easy and advantageous partial recycling of the panels themselves in the event of damage during the transportation and assembly operations. Finally the panel according to the present invention greatly facilitates both the mechanical and the hydraulic installation operations and avoids the need for any traditional masonry work since the final surface of the radiating wall formed by said panels is already able to receive the final coat of filler and paint.

The radiating panel according to the present invention has been described with reference to particular embodiments thereof, but it is obvious that various modifications may be made thereto, for example in the form and in the arrangement of the zones 5 or 6, in the distribution of the coiled pipes 3, and in the arrangement or type of end portions 4, without thereby departing from the protective scope of the present invention, as defined in the accompanying claims.

What is claimed is:

1. A prefabricated, rectangular, self-supporting, radiating panel (P) comprising two opposite long sides and two opposite short sides and comprising a sandwich structure formed by a one-piece layer of plasterboard (1) and a layer of heat-insulating material (2), said plasterboard layer (1) incorporating, internally, pipes (3) for a working fluid, end portions of said pipes emerging from a side of the panel, a plurality of said pipes (3) being each housed in cavities arranged in a coiled outline on the side of the plasterboard next to said heat-insulating material (2) and in adjacent modular zones (6) of the panel and each pipe forming an independent hydraulic circuit, said zones (6) being rectangular and comprising two opposite short sides and two opposite long sides parallel to said short sides of said panel, said panel being a single, stand-alone panel, said zones (6) being separable from one another so as to provide panel parts of different sizes.

2. The radiating panel as claimed in claim 1, wherein end portions (4) of each of said independent hydraulic circuits emerge laterally from the panel (P) along a said long side of the panel.

3. The radiating panel as claimed in claim 2, wherein said pipe (3) is a pipe made of metallic material.

4. The radiating panel as in claim 1, wherein said zones (6) have all equal areas and house all equal lengths of said pipe (3).

5. The radiating panel as claimed in claim 1, wherein linear marking lines (L) separating adjacent said zones are visible on an external surface of the panel (P).

6. The radiating panel as claimed in claim 1, wherein the width of the heat insulating layer (2) of the panel is less than the width of the plasterboard (1) by an amount sufficient to allow said end portions (4) to emerge freely from the plasterboard layer (1) and allow direct fixing of the plasterboard panel (P) to supporting sections (9, 10).

7. The radiating panel as claimed in claim 1, comprising moreover two top and bottom end zones (5), which are devoid of pipes (3) and insulating layer (2), for housing lines (11) supplying a thermal carrier fluid to the panel (P).

8. The radiating panel as claimed in claim 1, wherein said pipe (3) is a pipe made of plastic material.

9. The radiating panel as claimed in claim 1, wherein said layers (1, 2) of the panel are fixed together by means of gluing.

10. The radiating wall formed by a plurality of panels as claimed in claim 1, wherein said panels (P) are arranged alongside one another such that pairs of neighboring panels (P) are adjacent along sides of the panels which do not have end portions (4) of the pipes (3) and instead are separated from one another, along sides of the panels provided with the said end portions (4), by a predetermined distance sufficient to allow the insertion, between the panels, of secondary headers (8) which are connected to said end portions (4).

11. The radiating wall as claimed in claim 10, which is fixed to pre-existing masonry walls or ceilings by means of interposed metal support sections with a square or U-shaped cross-section (9) along lines joining together adjacent panels and metal support sections with an Ω-shaped cross-section (10) along a strip joining together non-adjacent panels.

12. The radiating wall as claimed in claim 11, wherein said secondary headers (8) are housed in said metal sections with an Ω-shaped cross-section (10), where they are connected to said end portions (4) of the coiled pipes (3).

13. The radiating wall as claimed in claim 11, which also comprises main supply lines (11) for supplying thermal carrier fluid to said secondary headers (8), which are housed behind the panels (P) along strips 1f of said panels which do not have said heat insulating layer (5).

14. The radiating wall as claimed in claim 11, also comprising along said Ω-shaped metal sections, a plasterboard covering panel (C).

15. A method for manufacturing a radiating panel comprising, during manufacture, the steps in succession of:
   a) milling plural cavities (7) on one side of a single plasterboard panel (1);
   b) inserting pipes (3) into said cavities (7); and
   c) gluing directly onto the plasterboard on the abovementioned side of the panel a layer (2) of heat insulating material.

16. The method as claimed in claim 15, which further comprises, during manufacture, the following steps:
   a1) forming said cavities (7) with a coiled arrangement, two ends of each coiled cavity opening at one and the same side of the panel (P);
   b1) forming said pipes (3) as only one continuous pipe, said continuous pipe emerging from said side of the panel, as a free end at the bottom and the top of the panel and as a loop at the boundary between adjacent coiled cavities;
   d) sealing said continuous pipe (3) inside said cavity using a heat-conducting sealing material.

17. The method as claimed in claim 16, which further comprises the step of:
   e) cutting said continuous pipe (3) at the loops thereof connecting adjacent coiled cavities, thereby to permit said coils to be connected individually to hydraulic circuits.

* * * * *